(12) United States Patent
Le Scouarnec et al.

(10) Patent No.: US 10,708,058 B2
(45) Date of Patent: Jul. 7, 2020

(54) DEVICES AND METHODS FOR CLIENT DEVICE AUTHENTICATION

(71) Applicant: INTERDIGITAL CE PATENT HOLDINGS, SAS, Paris (FR)

(72) Inventors: Nicolas Le Scouarnec, Liffre (FR); Christoph Neumann, Rennes (FR); Olivier Heen, Domloup (FR); Jean-Ronan Vigouroux, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 142 days.

(21) Appl. No.: 15/798,502

(22) Filed: Oct. 31, 2017

(65) Prior Publication Data

US 2018/0131519 A1 May 10, 2018

(30) Foreign Application Priority Data

Nov. 4, 2016 (EP) ..................................... 16306445
Jun. 6, 2017 (EP) ..................................... 17305661

(51) Int. Cl.
*H04L 9/32* (2006.01)
*G06F 21/31* (2013.01)
(Continued)

(52) U.S. Cl.
CPC ............ *H04L 9/3226* (2013.01); *G06F 21/31* (2013.01); *H04L 9/0863* (2013.01);
(Continued)

(58) Field of Classification Search
CPC .... H04L 9/3226; H04L 9/0863; H04L 9/0891
See application file for complete search history.

(56) References Cited

U.S. PATENT DOCUMENTS 5,418,854 A    5/1995   Kaufman et al.
7,370,350 B1   5/2008   Salowey
(Continued)

FOREIGN PATENT DOCUMENTS

CN    100362819    1/2008
CN    105847058    8/2016
(Continued)

OTHER PUBLICATIONS

Wikipedia_S Key.pdf, Oct. 26, 2015.
(Continued)

*Primary Examiner* — Ali Shayanfar
(74) *Attorney, Agent, or Firm* — Invention Mine LLC (57) ABSTRACT

An access point receives from a client a first nonce and a first cryptographic hash for the first nonce, the first cryptographic hash calculated using a first key derived from a second key, the second key input on the client or derived from a passphrase input on the client, derives first keys from each of a stored primary input and at least one stored secondary input valid at the deriving, the stored primary input and the at least one stored secondary input each being one of a second key and a passphrase, verifies the cryptographic hash using each derived first key to find a derived first key that checks the first cryptographic hash, generates a third key and a second cryptographic hash using the derived first key that checks the first cryptographic hash, and sends the third key and the second cryptographic hash to the client.

9 Claims, 4 Drawing Sheets (51) Int. Cl.
*H04L 9/08* (2006.01)
*H04W 88/08* (2009.01)
*H04L 29/06* (2006.01)
*H04W 12/04* (2009.01)
*H04W 12/06* (2009.01)
*H04W 84/12* (2009.01)

(52) U.S. Cl.
CPC .......... *H04L 9/0891* (2013.01); *H04L 9/3242* (2013.01); *H04L 9/3271* (2013.01); *H04L 63/061* (2013.01); *H04L 63/083* (2013.01); *H04L 63/0876* (2013.01); *H04W 12/04* (2013.01); *H04W 12/06* (2013.01); *H04W 84/12* (2013.01); *H04W 88/08* (2013.01)

(56) References Cited

U.S. PATENT DOCUMENTS

| | | | |
|---|---|---|---|
| 8,532,304 B2* | 9/2013 | Asokan | H04L 63/065 380/284 |
| 9,009,805 B1* | 4/2015 | Kirkby | H04N 21/2187 726/7 |
| 9,148,776 B1* | 9/2015 | Schroeder | H04W 8/087 |
| 9,280,657 B2 | 3/2016 | Eluard et al. | |
| 9,305,150 B2 | 4/2016 | Buck | |
| 9,736,699 B1* | 8/2017 | Rao | H04W 4/80 |
| 9,779,401 B2* | 10/2017 | Benoit | G06Q 20/401 |
| 9,875,368 B1* | 1/2018 | Willden | G06F 21/62 |
| 10,149,159 B1* | 12/2018 | Perfitt | H04W 12/06 |
| 2002/0090089 A1 | 7/2002 | Branigan et al. | |
| 2006/0251256 A1* | 11/2006 | Asokan | H04L 63/065 380/270 |
| 2008/0046732 A1* | 2/2008 | Fu | G06Q 20/3674 713/171 |
| 2008/0066167 A1 | 3/2008 | Andri | |
| 2008/0082817 A1 | 4/2008 | Takahashi et al. | |
| 2010/0115583 A1 | 5/2010 | Delia et al. | |
| 2010/0145861 A1* | 6/2010 | Law | G06Q 20/102 705/76 |
| 2010/0202610 A1* | 8/2010 | Warren | H04M 1/6091 380/200 |
| 2011/0185407 A1* | 7/2011 | Perrot | H04L 63/08 726/6 |
| 2013/0254036 A1* | 9/2013 | Trinh | G06Q 30/0251 705/14.64 |
| 2014/0068757 A1 | 3/2014 | Komatsu | |
| 2014/0156989 A1* | 6/2014 | Lalwani | H04L 9/0894 713/155 |
| 2015/0363588 A1 | 12/2015 | Stahl et al. | |
| 2015/0363593 A1 | 12/2015 | Joye | |
| 2016/0117494 A1 | 4/2016 | Kaplan et al. | |
| 2016/0127903 A1* | 5/2016 | Lee | H04W 84/12 713/171 |
| 2016/0269403 A1* | 9/2016 | Koutenaei | H04L 63/0861 |
| 2016/0330028 A1 | 11/2016 | Lu et al. | |
| 2018/0011555 A1* | 1/2018 | Park | G06F 3/0482 |

FOREIGN PATENT DOCUMENTS

| | | |
|---|---|---|
| EP | 2876569 | 5/2015 |
| EP | 2947591 | 11/2015 |
| EP | 3067811 | 9/2016 |
| JP | 2003141079 | 5/2003 |
| JP | 2003150552 | 5/2003 |
| JP | 4778793 | 9/2011 |

OTHER PUBLICATIONS

Ping et al., "Identity authentication scheme using OTP in wireless LAN", Jul. 2008.
Huang et al., OSNP_Secure wireless autentification protocol using one-time key, pp. 803-815, 2009.
Anonymous, "RADIUS Authentication Schemes", Feb. 15, 2018.
Jako, "How to Hack WPA-WPA2-Enterprise", Part 1, Oct. 16, 2015.
Binod et al., "Using one-time password based authentication for Wireless IP Network", 2005.
Lindqvist et al., "Privacy-preserving 802.11 Access-Point Discovery", pp. 123-130, 2009.
Menezes et al., "Handbook of Applied Cryptography", Chapter 12, XP001525012,1996.
Anonymous, "Part 11: Wireless LAN Medium Access Control (MAC) and Physical Layer (PHY) specifications, Amendment 6: Medium Access Control (MAC) Security Enhancements", 802.11i IEEE Standard for Information technology—Telecommunications and information exchange between systems—Local and metropolitan area networks—Specific requirements, Jul. 23, 2004, pp. 1-190.
Chatterjee et al., "pASSWORD tYPOS and How to Correct Them Securely", 2016 IEEE Symposium on Security and Privacy (SP), San Jose, California, USA, May 22, 2016, pp. 799-818.
Anonymous, "MS-CHAP v2", Microsoft Corporation, https://technet.microsoft.com/enus/library/cc957983.aspx?f=255&MSPPError=-2147217396, Mar. 28, 2017, p. 1.
Anonymous, "IEEE 802.11i-2004", Wikipedia, https://en.wikipedia.org/w/index.php?title=IEEE_802.11i-2004&oldid=714873605, Apr. 12, 2016, pp. 1-4.

* cited by examiner

DEVICES AND METHODS FOR CLIENT DEVICE AUTHENTICATION

REFERENCE TO RELATED EUROPEAN APPLICATION

This application claims priority from European Patent Application No. 16306445.4, entitled "DEVICES AND METHODS FOR CLIENT DEVICE AUTHENTICATION", filed on Nov. 4, 2016, and European Patent Application No. 17305661.5, entitled "DEVICES AND METHODS FOR CLIENT DEVICE AUTHENTICATION", filed on Jun. 6, 2017 the contents of which are hereby incorporated by reference in their entirety.

TECHNICAL FIELD

The present disclosure relates generally to network security and in particular to client device authentication in networks.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In wireless communications, it is often desirable to restrict access to a so-called access point to authorized client devices only. Wi-Fi, the most widespread wireless networking technology, will be used herein as a non-limitative illustrative example.

A first solution for authenticating client devices is through the use of certificates, but as these require complex installation and management, the solution is not suitable in many cases.

A second solution uses a shared secret that a user inputs on a client device, which then proves knowledge of the shared secret to the access point.

Figure 1:
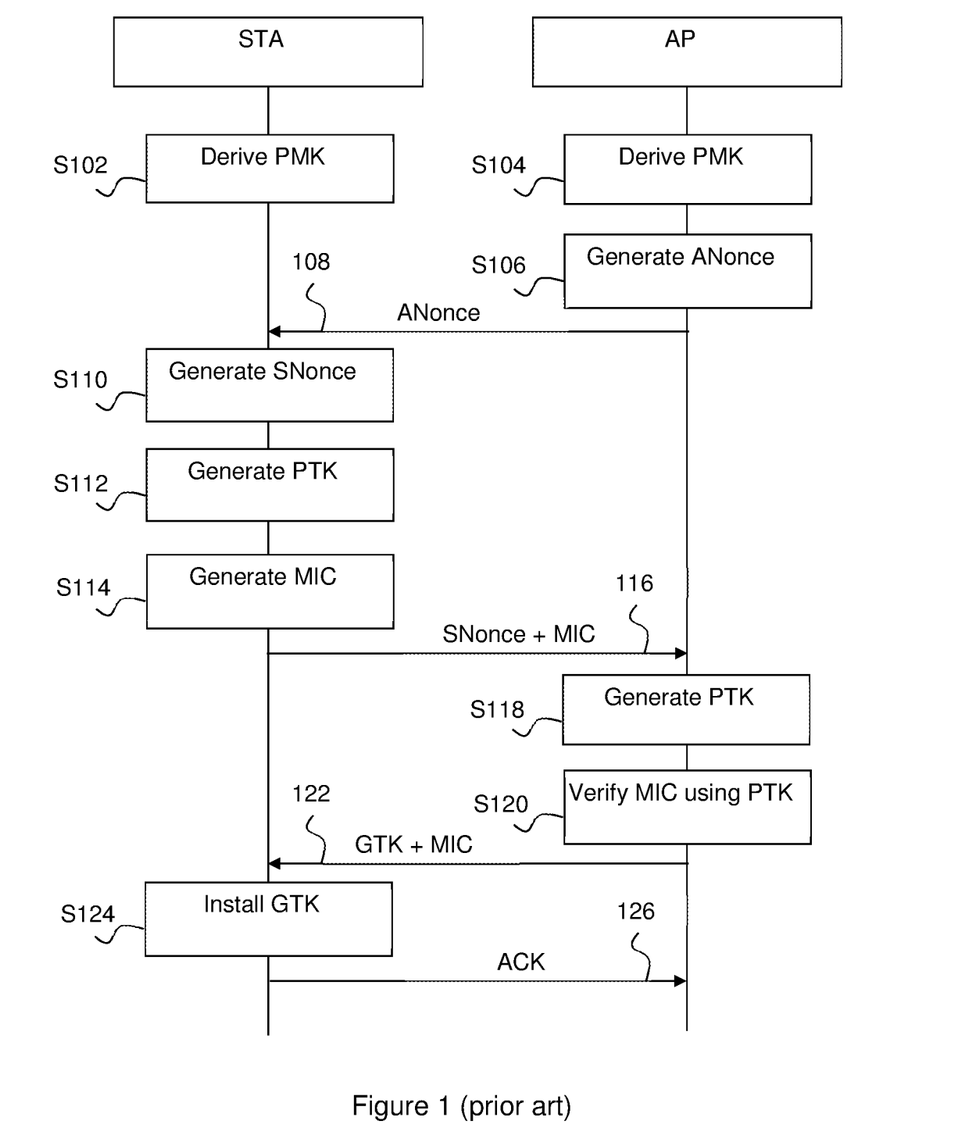
FIG. 1 illustrates a conventional Wi-Fi Protected Access (WPA) Personal protocol.

The second solution is widely used in for example Wi-Fi Protected Access (WPA) Personal (also known as WPA-PSK (Pre-Shared Key)), having a second version called WPA2 Personal, described in the standard IEEE 802.11i and illustrated in FIG. 1.

In steps S102 and S104, the client device STA and the access point AP independently of each other derive a Pairwise Master Key (PMK) using a key derivation function called Password-Based Key Derivation Function 2 (PB-KDF2) taking as input a shared passphrase, a network identifier called Service Set Identifier (SSID) and the length of the SSID. Alternatively, the PMK can be entered as a string of 64 hexadecimal digits.

In step S106, the AP generates a random number (i.e., a nonce) ANonce that it sends in a message 108 to the STA.

STA generates a random number (i.e., a nonce) SNonce, in step S110, and generates, in step S112, a Pairwise Transient Key (PTK) from the nonces, the PMK and the Media Access Control (MAC) addresses of the client device STA and the access point AP. STA then generates, in step S114, a Message Integrity Code (MIC) for SNonce; the MIC is the keyed cryptographic hash (HMAC-SHA1 or AES-CMAC) of the SNonce. The MIC uses the 128-bit PTK as key. STA then sends SNonce and the MIC in message 116 to AP.

Upon reception of SNonce and the MIC, the AP derives, in step S118, the PTK in the same way as STA did in step S112. In step S120, the AP verifies that the MIC is correct. At this point, STA and AP are authenticated and have mutually derived the same PTK.

The AP sends to STA message 122 comprising a Group Temporal Key (GTK) and a sequence number protected using a second MIC (encrypted using bits 128-256 of PTK). Upon reception of message 122, STA installs, in step S124, the GTK, which then can be used to send packets to the wireless network managed by the AP. Finally, STA sends an acknowledgement 126 to the AP.

Another possibility is WPA-Enterprise that works in a different way in order to offer Extensible Authentication Protocol (EAP). Among the many EAP protocols, the most common are Protected Extensible Authentication Protocol (PEAP), Transport Layer Security (TLS) and Tunnelled Transport Layer Security (TTLS). Among these, TLS requires certificates on both the client and the server, while TTLS and PEAP are quite similar in that they both have a certificate on the server and a password input by the client.

As an example, PEAP uses Microsoft's Challenge Handshake Authentication Protocol, version 2 (MS-CHAP v2) to exchange the password as follows. The client and an authenticator (RADIUS server) establish a tunnel through the AP. The authenticator sends a Session ID and a first challenge to the client, which replies with a user name, a second challenge and a hash of the challenges, the Session ID and the MD4 hash of the user's password. The RADIUS server checks the hash and responds with success or failure as appropriate, and informs the AP to accept the client, which causes the AP to initiate a 4-way handshake with the client to adopt a shared key.

A problem with shared secrets and passwords is that inputting them is a task that is prone to error, in particular when the data to input is long or complicated, as is often the case for Wi-Fi in order to provide an acceptable level of security. In an attempt to mitigate this problem, it has been proposed to use Wi-Fi Protected Setup (WPS). However, many devices, such as iOS devices, do not support WPS and some implementations of WPS have been plagued by security issues, thus limiting their use.

In "pASSWORD tYPOS and How to Correct Them Securely," Chatterjee et al.

propose authentication methods that are tolerant to typos in passwords. While the paper provides some formal evaluation, but proposes only theoretical solutions without providing any implementations or how to integrate such an approach in an authentication protocol that already exists.

Other typo-tolerant solutions have been described in for example EP 2947591, EP 2876569, EP 3067811, US 2015/0363588 and US 2015/0363593 that all necessitate modification of the client device, and U.S. Pat. No. 9,280,657 in which the server learns to accept input, faulty passwords followed by a correct password. As such, these conventional solutions have drawbacks.

Another problem with shared secrets and passwords in networks based on technologies like Wi-Fi is that they use a single shared secret or password. To give, for example, a guest access to the network, this is either done by giving the guest the network password. This means that the guest can continue accessing the network until the network password is changed, which is inconvenient since changing the network password requires changing the password on every device that should have access to the network.

On the other hand, a gateway may use a second SSID to provide a guest with for example Internet access, but since the second SSID is different from the first SSID, this does not enable access to the network of the first SSID.

A different solution is the use of one-time passwords, but these typically do not give a guest access to the same network as that used by the users.

It will be appreciated that it is desired to have a solution that overcomes at least part of the conventional problems related to input of shared secrets in wireless communication networks.

SUMMARY OF DISCLOSURE

In a first aspect, the present principles are directed to a method for client authentication at an access point. At least one hardware processor of the access point receives from a client a first nonce and a first cryptographic hash for the first nonce, the first cryptographic hash calculated using a first key derived from a second key, the second key input on the client or derived from a passphrase input on the client, derives first keys from each of a stored primary input and at least one stored secondary input valid at the deriving, the stored primary input and the at least one stored secondary input each being one of a second key and a passphrase, verifies the cryptographic hash using each derived first key to find a derived first key that checks the first cryptographic hash, generates a third key and a second cryptographic hash using the derived first key that checks the first cryptographic hash, and sends the third key and the second cryptographic hash to the client.

Various embodiments of the first aspect include:

That each stored secondary input has a defined, limited period of validity or corresponds to the primary input with at least one typing error. The third key can be renewed when a stored secondary input becomes invalid That the access point is a Wi-Fi access point that also sends a second nonce to the client and that the first keys are further derived from the first nonce and the second nonce.

That the third key is sent encrypted using an encryption key generated from the derived first key that checks the first cryptographic hash.

In a second aspect, the present present principles are directed to an access point that includes a communications interface configured to receive from a client a first nonce and a first cryptographic hash for the first nonce, the first cryptographic hash calculated using a first key derived from a second key, the second key input on the client or derived from a passphrase input on the client, and send to the client a third key and a second cryptographic hash, memory configured to store a primary input and at least one secondary input, the primary input and the at least one secondary input each being one of a second key and a passphrase, and at least one hardware processor configured to derive first keys from each of the stored primary input and at least one secondary input valid at the deriving, verify the cryptographic hash using each derived first key to find a derived first key that checks the first cryptographic hash, and generate the third key and the second cryptographic hash using the derived first key that checks the first cryptographic hash.

Various embodiments of the second aspect include:

That each stored secondary input has a defined, limited period of validity or corresponds to the primary input with at least one typing error. The third key can be renewed when a stored secondary input becomes invalid.

That the access point is a Wi-Fi access point and that the communications interface is further configured to send a second nonce to the client and wherein the at least one hardware processor is configured to derive the first keys further from the first nonce and the second nonce. The at least one hardware processor can be further configured to derive first keys from a stored secondary input only during the period of validity for the stored secondary input.

That the at least one hardware processor is further configured to encrypt the third key using an encryption key generated from the derived first key that checks the first cryptographic hash before transmission to the client.

In a third aspect, the present principles are directed to a method for authenticating a client device at a Wi-Fi Protected Access 2 Enterprise authenticator device by sending to the client device a session identifier and a first challenge, receiving from the client device a username, a second challenge and a cryptographic hash for a first challenge, the second challenge, a session identifier and a passphrase, verifying if a valid stored primary passphrase or at least one valid stored secondary passphrase checks the cryptographic hash, each stored secondary passphrase valid during a limited defined period of validity or each stored secondary input corresponding to the primary input with at least one typing error, and in case a passphrase checks the cryptographic hash, sending to the client device a message indicating successful authentication and performing a handshake with the client device to adopt a key.

In a fourth aspect, the present principles are directed to a Wi-Fi Protected Access 2 Enterprise authenticator device that includes a communications interface configured to send to a client device a session identifier and a first challenge, and receive from the client device a username, a second challenge and a cryptographic hash for a first challenge, the second challenge, a session identifier and a passphrase, and at least one hardware processor configured to verify if a valid stored primary passphrase or at least one valid stored secondary passphrase checks the cryptographic hash, each stored secondary passphrase valid during a limited defined period of validity or each stored secondary input corresponding to the primary input with at least one typing error, and in case a passphrase checks the cryptographic hash, send to the client device, via the communications interface, a message indicating successful authentication and perform a handshake with the client device to adopt a key.

In a fifth aspect, the present principles are directed to a computer program product which is stored on a non-transitory computer readable medium and comprises program code instructions executable by a processor for implementing the steps of a method of the first aspect.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 2:
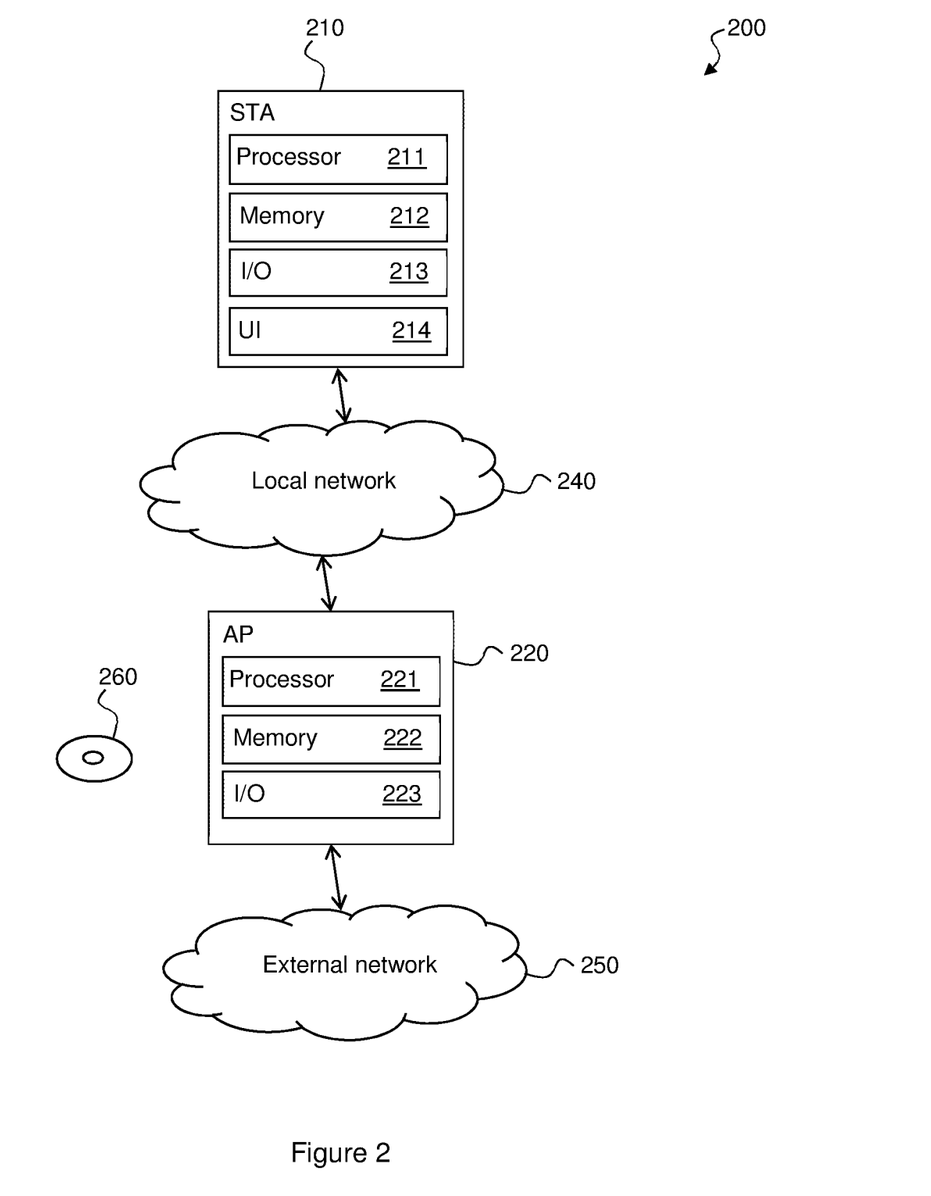
FIG. 2 illustrates an exemplary system according to a first embodiment of the present principles.

FIG. 2 illustrates an exemplary system 200 according to a first embodiment of the present principles. The system 200 comprises a client device (STA) 210, and an access point (AP) 220 such as a gateway. The access point 220 is configured to interface to a local network 240 and an external network 250, such as the Internet, through which connections can be made to devices in another network (not shown). In the exemplary system, the local network 240 is a Wi-Fi network.

The client device 210 and the access point 220 each includes at least one hardware processing unit ("processor") 211, 221, memory 212, 222 and at least one communications interface 213, 223, in the example a Wi-Fi interface, configured to communicate with other devices. The skilled person will appreciate that the illustrated devices are very simplified for reasons of clarity and that real devices in addition would include features such as internal connections and power supplies. Non-transitory storage media 260 stores instructions that, when executed by a processor, perform the functions of the access point 220 as further described hereinafter.

The client device 210, possibly connected to the local network 240, further includes a user interface 214. The client device can for example be a laptop, a smartphone or a tablet.

The access point 220 is configured to perform conventional access point functions such as interfacing the local network 240 and the external network 250. A plurality of client devices may be connected to or through the local network 240, or one local network as the access point 220 may offer a plurality of local networks, for instance in the form of isolated subnets. Typically, any device that proves knowledge of a shared network secret, such as a network key, is given access to the local network 240.

The external network 250 can be used to connect to servers and other devices, possibly through other access points (not shown).

Figure 3:
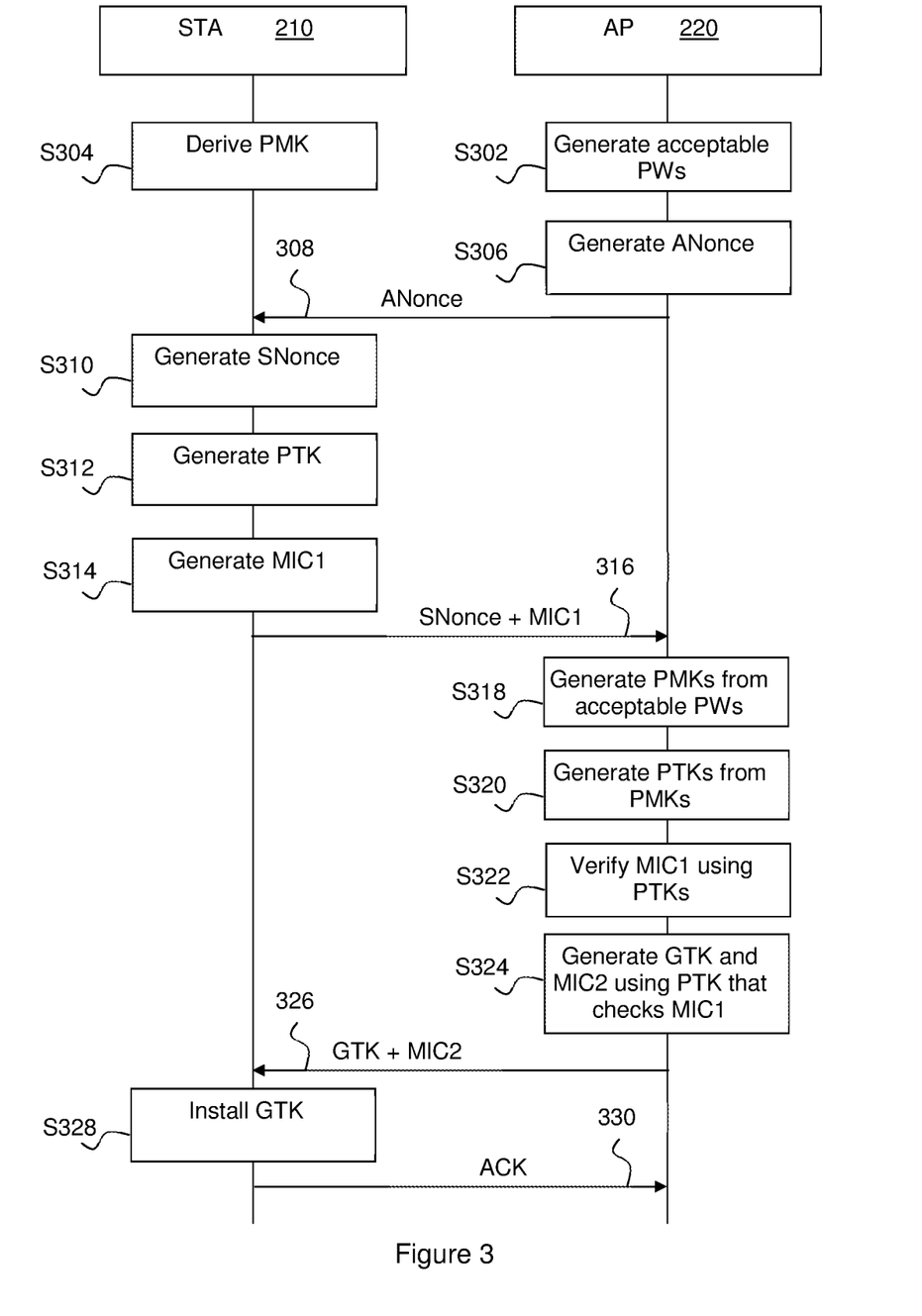
FIG. 3 illustrates an exemplary method for device insertion according to an embodiment of the present principles.

FIG. 3 illustrates an exemplary method for device insertion according to an embodiment of the present principles.

In step S302, the processor 221 of the access point ("AP") 220 generates a limited set of faulty but acceptable passphrases from a main passphrase set in the configuration of the access point 220, the set including the main passphrase. In other words, the processor 221 generates and stores a set of passphrases including the original, correct, passphrase and a number of variant passphrases including at least one error. It is preferred that the errors that are introduced correspond to common errors, such as for example (with the number of variants including the original passphrase for a 32-character passphrase within parenthesis):

omitting a character at any random position (33);
inverting capitalization (2);
adding a space every 4 characters (9);
replacing l (capitalized i) with 1 (lower case L) (2);
replacing 0 (zero) by O (2);
replacing one character (any one) with one of the 4 closest (4*32+1=129);
replacing one or two characters (any two) with one of the 4 closest (($_2^{32}$)*4+32*4+1=2113)
any combination of those (the product of the number of variants, 5020488). Note that even when accepting any combination of such errors, it removes at most 23 bits of entropy. If the character are hexadecimals number (0-9A-F) which is common in factory set passphrases, the original entropy is 32*4=128 bits. Accepting all these errors leaves (at least) 105 bits of entropy which is still sufficient in many cases.

In a variant, the processor 221 of the access point ("AP") 220 generates a set of acceptable passphrases that includes a main, default passphrase and at least one valid secondary passphrase. The main passphrase is typically a passphrase that is used by regular users of the network and that remains valid until changed by, for example, a user or administrator of the network. The second passphrase is used by for example guests in the network; its validity is typically limited in time but it can also be valid until revoked.

In this variant, the processor 221 can be configured to generate secondary passphrases valid for one day each. The set of acceptable passphrases then include the main passphrase and the secondary passphrase valid for the current day. For example, each day the processor can generate, using for instance iterative one-way hashing, secondary passphrases for the current day and for the following N days. These secondary passphrases can be displayed in a user interface of the AP (not shown) or sent to the device of a user having connected using the main passphrase for display on its UI 214 or a device running a dedicated application. By having the processor 221 generate a plurality of secondary passphrases, a guest can at once be given access during a plurality of days.

In a embodiment of the variant, the access point includes a "guest WPS button". This button implements the same mechanism as WPS, with the exception that the passphrase of the day is pushed to the client (instead of the default passphrase).

In the embodiment of the variant, a user activates a Wi-Fi Protected Setup button on the guest device, activates the Wi-Fi Protected Setup button on the AP 220. The AP and the guest device then perform a Diffie-Hellman key exchange, after which the AP sends the passphrase of the day to guest device, which uses the passphrase during connection to the network, after which the AP performs authentication as described hereinbefore.

A salient difference from the conventional protocol described in FIG. 1, the access point 220 does not necessarily derive the PMK at the beginning, but can wait until it receives SNonce+MIC from the client device ("STA") 210. It is noted that the protocol remains unchanged for the client device 210.

In step S304, the client device 210 derives the Pairwise Master Key (PMK) using the key derivation function (in the example, PBKDF2) taking as input an input passphrase, a network identifier called Service Set Identifier (SSID) and the length of the SSID. Alternatively, the PMK can be entered as a string of 64 hexadecimal digits.

In step S306, the access point 220 generates a random number ANonce that it sends in a message 308 to the client device 210.

The client device 210 generates another random number SNonce, in step S310, and generates, in step S312, a Pairwise Transient Key (PTK) from the nonces, the PMK and the Media Access Control (MAC) addresses of the client device 210 and the access point 220. The client device 210 then generates, in step S314, a Message Integrity Code (MIC)—MIC1 in FIG. 3—for SNonce; MIC1 is the keyed cryptographic hash (HMAC-SHA1 or AES-CMAC) of the SNonce. A MIC uses the 128 bits PTK as key. The client device 210 then sends SNonce and MIC1 in message 316 to the access point 220.

Upon reception of SNonce and MIC1, the access point 220 derives, in step S318, a PMK from each passphrase in the set of acceptable passphrases. The generated PMKs can be stored instead of, or in addition to, the set of acceptable passphrases. Alternatively, in case the PMK is input as a string of 64 hexadecimal digits, the access points 220 derives and stores acceptable PMKs from the correct PMK. It is noted that this step can be performed beforehand, for example just after step S302.

In step S320, the access point 220 generates a PTK for each PMK generated in step S318, using the same generation method as the client device 210 did in step S312.

In step S322, the access point 220 verifies that MIC1 is correct for any PTK generated in step S320. If a PTK enables verification of MIC1, then this PTK is set as the current PTK. At this point, access point 220 and the client device 210 are authenticated and have mutually derived the same PTK (from a main or secondary passphrase). It is noted that if no PTK enables verification of the MIC, then the client device 210 is not authenticated, just as if an incorrect passphrase was input in the conventional method illustrated in FIG. 1.

The access point 220 generates, in step S324, a Group Temporal Key (GTK) and a sequence number protected using a second MIC (encrypted using bits 128-256 of PTK)≥MIC2 in FIG. 3—that are sent in to the client device 210 in message 326. Upon reception of the message 326, the client device 210 installs, in step S328, the GTK, which then can be used to send packets to the wireless network managed by the access point 220. Finally, client device 210 sends an acknowledgement 330 to the access point 220.

As can be seen, the access point 220 tries to find the passphrase in the set of acceptable passphrases under which the received MIC, MIC1, is valid. If such a passphrase is found, then the client can be authenticated, and the passphrase is used as the basis for the rest of the exchange (i.e., deriving the PTK, ciphering the GTK and signing the messages).

The access point preferably stores the PMK used by a given client device (identified by its MAC address). In other words, the access point stores the PMK from which was generated the PTK that enabled verification of the MIC. This way, the next time the client device connects, the access point can retrieve the stored PMK, which can reduce the number of guessed passphrases at reconnections.

In the variant with time limited passphrases, it is preferable for the access point 220 to revoke secondary keys that are no longer valid, such as revoking a day key when its day of validity is over.

A simple approach for secondary key revocation is for the access point 220 to renew the GTK whenever a secondary key expires. The GTK can be renewed using the so-called Group Key handshake mechanism defined in IEEE 802.11i. Naturally, other suitable mechanisms may also be used.

A more elaborate approach for secondary key revocation is for the access point 220 to keep track of whether or not a secondary key has been used by a guest device. In case the secondary key has not been used, then there is no need to renew the GTK when the secondary key expires. The GTK is renewed, for example using the Group Key handshake mechanism, only when an expired secondary key was used during the validity of the secondary key.

The present principles extend to the case of password-based WPA2 Enterprise (PEAP/EAP-TTLS). As for Wi-Fi, the set of acceptable passwords is tried to determine if the authentication is a success or not.

Figure 4:
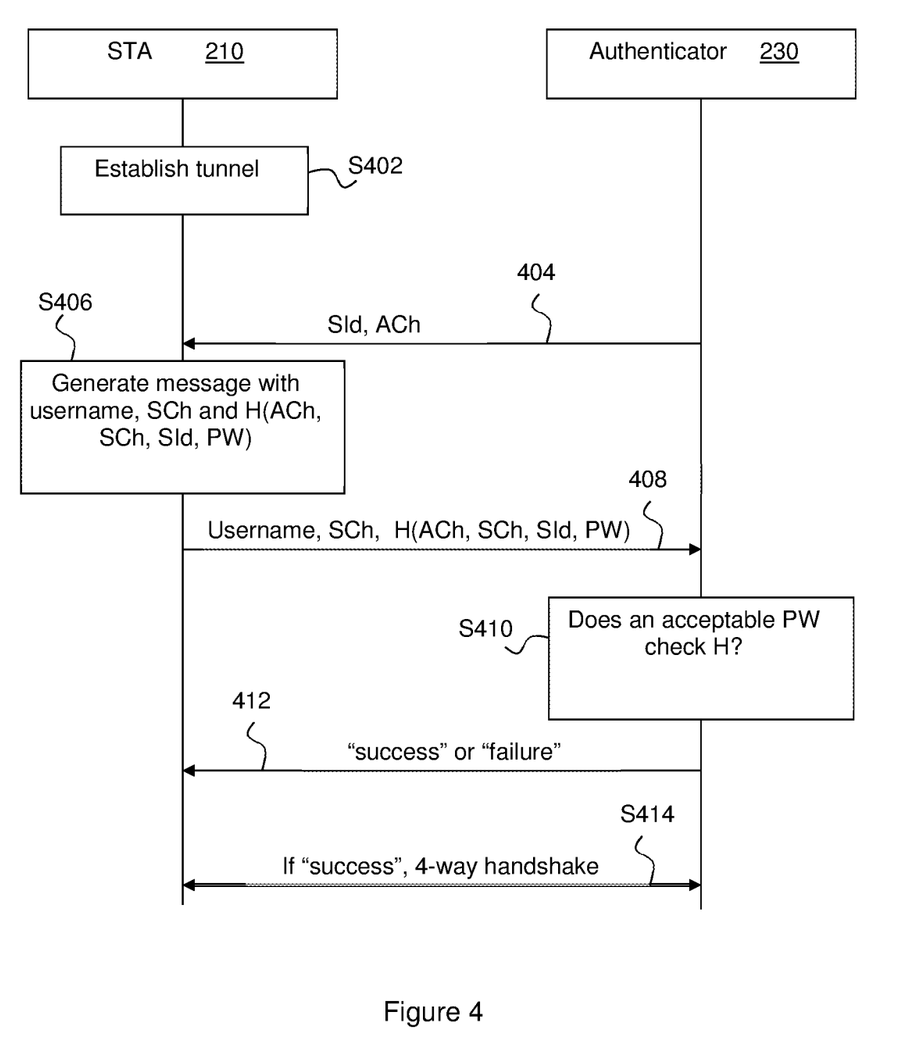
FIG. 4 illustrates an exemplary method for device insertion according to a further embodiment of the present principles.

FIG. 4 illustrates an exemplary method for device insertion according to a further embodiment of the present principles.

FIG. 4 illustrates a client device 210 that can be identical to the client device in FIG. 2. The Figure also shows an authenticator 230 that, although not illustrated for reasons of succinctness, includes at least one hardware processing unit ("processor"), memory and at least one communications interface configured to communicate with other devices.

In step S402, the client device 210 establishes, through an access point (220 in FIG. 2), a Transport Level Security (TLS) tunnel with the authenticator device 230, such as a RADIUS server. The authenticator 230 sends, in message 404, a Session ID (Sid) and a Challenge (ACh) to the client device 210. The client device 210 generates, in step S406, a message 408 with a Username, a Challenge (SCh) and a MD4 hash of the challenges (Ach, SCh), the SessionID (Sid) and the user password. The message 408 is sent to the authenticator 230. So far, the method corresponds to the conventional method.

In step S410, the authenticator 230 checks, if any user password in a set of acceptable user passwords for the user checks the hash H; in other words, if a calculated MD4 hash of the challenges (Ach, SCh), the SessionlD (Sid) and a user password in the set of acceptable user passwords is identical with the hash H received in message 408.

The authenticator 230 then sends a message 412 to the client device 210. If no password in the set checks the hash H, then the message 412 indicates failure, the client device 210 is not authenticated and the method ends. However, if a password does check the hash H, then the message 412 indicates success and the client device 210 is authenticated. The client device 210 and the authenticator then initiate, in step S414, the conventional 4-way handshake to adopt a key.

As will be appreciated, the present principles work with existing clients and only requires modification at, depending on the embodiment, access points or RADIUS servers. Further, as the original passphrase or password is part of the set, the methods are backward compatible.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A method for client authentication at an access point, the method comprising, in at least one hardware processor of the access point:
    receiving from a client a first cryptographic hash for the first nonce, the first cryptographic hash calculated using a first key derived from a second key, the second key input on the client or derived from a passphrase input on the client;
    deriving first keys from each of a stored primary input and at least one stored secondary input valid at the deriving, the stored primary input and the at least one stored secondary input each being one of a second key and a passphrase;
    verifying the cryptographic hash using each derived first key to find a derived first key that checks the first cryptographic hash;
    generating a third key and a second cryptographic hash using the derived first key that checks the first cryptographic hash;
    sending the third key, encrypted using an encryption key generated from the derived first key that checks the first cryptographic hash, and the second cryptographic hash to the client; and
    renewing the third key when a stored secondary input becomes invalid.

2. The method of claim 1, each stored secondary input having a defined, limited period of validity or each stored secondary input corresponding to the primary input with at least one typing error.

3. The method of claim 1, wherein the access point is a Wi-Fi access point and the method further comprises receiving a first nonce from the client and sending a second nonce to the client and wherein the first keys are further derived from the first nonce and the second nonce.

4. An access point comprising:
    a communications interface configured to:
        receive from a client a first cryptographic hash for the first nonce, the first cryptographic hash calculated using a first key derived from a second key, the second key input on the client or derived from a passphrase input on the client; and
        send to the client a third key and a second cryptographic hash;
    memory configured to store a primary input and at least one secondary input, the primary input and the at least one secondary input each being one of a second key and a passphrase; and
    at least one hardware processor configured to:
        derive first keys from each of the stored primary input and at least one secondary input valid at the deriving;
        verify the cryptographic hash using each derived first key to find a derived first key that checks the first cryptographic hash;
        generate the third key and the second cryptographic hash using the derived first key that checks the first cryptographic hash;
        encrypt the third key using an encryption key generated from the derived first key that checks the first cryptographic hash before transmission to the client; and
        renew the third key when a stored secondary input becomes invalid.

5. The access point of claim 4, each stored secondary input having a defined, limited period of validity or each stored secondary input corresponding to the primary input with at least one typing error.

6. The access point of claim 5, wherein the at least one hardware processor is further configured to renew the third key when a stored secondary input becomes invalid.

7. The access point of claim 4, wherein the access point is a Wi-Fi access point and the communications interface is further configured to receive a first nonce from the client and to send a second nonce to the client and wherein the at least one hardware processor is configured to derive the first keys further from the first nonce and the second nonce.

8. The access point of claim 7, wherein the at least one hardware processor is further configured to derive first keys from a stored secondary input only during the period of validity for the stored secondary input.

9. Computer program product which is stored on a non-transitory computer readable medium and comprises program code instructions executable by a processor to:
    receive from a client a first cryptographic hash for the first nonce, the first cryptographic hash calculated using a first key derived from a second key, the second key input on the client or derived from a passphrase input on the client;
    derive first keys from each of a stored primary input and at least one stored secondary input valid at the deriving, the stored primary input and the at least one stored secondary input each being one of a second key and a passphrase;

verify the cryptographic hash using each derived first key to find a derived first key that checks the first cryptographic hash;
generate a third key, and a second cryptographic hash using the derived first key that checks the first cryptographic hash;
send the third key, encrypted using an encryption key generated from the derived first key that checks the first cryptographic hash, and the second cryptographic hash to the client; and
renew the third key when a stored secondary input becomes invalid.

* * * * *